US012760766B2

(12) United States Patent
Zhou et al.

(10) Patent No.: US 12,760,766 B2
(45) Date of Patent: Oct. 13, 2026

(54) ROLLING BEARING AND METHOD OF MANUFACTURING SAME

(71) Applicant: AKTIEBOLAGET SKF, Gothenburg (SE)

(72) Inventors: Xiaobo Zhou, Houten (NL); Thijs Nijdam, Amersfoort (NL); Andreas Vierling, Schwebheim (DE); Frank Henninger, Grafenrheinfeld (DE); Bo Shen, Jiangyin (CN); Lijun Cao, Houten (NL); Victor Brizmer, Utrecht (NL); Yafen Chen, Shanghai (CN); Hongyuan An, Shanghai (CN)

(73) Assignee: AKTIEBOLAGET SKF, Gothenburg (SE)

( * ) Notice: Subject to any disclaimer, the term of this patent is extended or adjusted under 35 U.S.C. 154(b) by 73 days.

(21) Appl. No.: 18/766,993

(22) Filed: Jul. 9, 2024

(65) Prior Publication Data

US 2025/0035160 A1 Jan. 30, 2025

(30) Foreign Application Priority Data

Jul. 26, 2023 (DE) ........................ 102023207105.3

(51) Int. Cl.
*F16C 33/66* (2006.01)
*F16C 33/58* (2006.01)

(52) U.S. Cl.
CPC ........ *F16C 33/6696* (2013.01); *F16C 33/586* (2013.01); *F16C 2202/02* (2013.01);
(Continued)

(58) Field of Classification Search
CPC ........ F16C 33/58; F16C 33/586; F16C 33/62; F16C 33/64; F16C 33/6696; F16C 35/07; F16C 35/073; F16C 35/077; F16C 2202/02; F16C 2202/30; F16C 2202/54; F16C 2226/40
See application file for complete search history.

(56) References Cited

U.S. PATENT DOCUMENTS 4,355,124 A 10/1982 Baumann et al.
4,511,606 A 4/1985 Ehrlich et al.
(Continued)

FOREIGN PATENT DOCUMENTS

DE 202014010549 U1 * 1/2016 ............. B32B 15/20
EP 2910805 B1 6/2017
(Continued)

OTHER PUBLICATIONS

Machine Translation of WO-8303612-A1 (Year: 1983).*
(Continued)

*Primary Examiner* — Alan B Waits
(74) *Attorney, Agent, or Firm* — J-TEK LAW PLLC; Jeffrey D. Tekanic; Scott T. Wakeman

(57) ABSTRACT

A rolling bearing includes an outer ring having an outer surface configured to be fitted into a first component, an inner ring having an inner surface configured to be fitted onto a second component, at least one rolling element arranged between the outer ring and the inner ring, and a polymer composite sheet bonded to the outer surface of the outer ring and/or to the inner surface of the inner ring by a bonding agent.

19 Claims, 2 Drawing Sheets

(52) U.S. Cl.
CPC ...... *F16C 2202/30* (2013.01); *F16C 2202/54* (2013.01); *F16C 2226/40* (2013.01)

(56) References Cited

U.S. PATENT DOCUMENTS

| | | | | |
|---|---|---|---|---|
| 6,726,994 | B1 * | 4/2004 | Araki | F16C 33/201 428/419 |
| 9,958,008 | B2 | 5/2018 | Vieira De Morais et al. | |
| 10,563,697 | B2 | 2/2020 | Motoda et al. | |
| 10,865,832 | B2 | 12/2020 | Motoda et al. | |
| 2014/0301880 | A1 | 10/2014 | Horibe et al. | |
| 2016/0290397 | A1 * | 10/2016 | Vieira De Morais | B32B 27/308 |
| 2019/0003529 | A1 * | 1/2019 | Motoda | F16C 33/586 |
| 2022/0341464 | A1 | 10/2022 | Fukuzawa et al. | |
| 2023/0272820 | A1 * | 8/2023 | Kawaguchi | F16C 33/586 384/463 |
| 2024/0052887 | A1 | 2/2024 | Takizawa et al. | |
| 2025/0034412 | A1 | 1/2025 | Zhou et al. | |
| 2025/0035157 | A1 | 1/2025 | Zhou et al. | |
| 2025/0035159 | A1 | 1/2025 | Zhou et al. | |

FOREIGN PATENT DOCUMENTS

| | | | | | |
|---|---|---|---|---|---|
| EP | 3957546 | A1 | * | 2/2022 | F16J 15/324 |
| JP | H11246823 | A | | 9/1999 | |
| JP | 2007002912 | A | | 1/2007 | |
| JP | 2009234481 | A | * | 10/2009 | F16C 35/073 |
| JP | 2011112191 | A | | 6/2011 | |
| JP | 2014228099 | A | | 12/2014 | |
| WO | WO-8303612 | A1 | * | 10/1983 | C09D 127/18 |

OTHER PUBLICATIONS

Machine Translation of JP-2009234481-A (Year: 2009).*
Machine Translation of DE-202014010549-U1 (Year: 2016).*
Machine Translation of EP-3957546-A1 (Year: 2022).*
Unpublished U.S. Appl. No. 18/766,964, first named inventor: Xiaobo Zhou, filing date: Jul. 9, 2024.
Unpublished U.S. Appl. No. 18/767,017, first named inventor: Xiaobo Zhou, filing date: Jul. 9, 2024.
Unpublished U.S. Appl. No. 18/767,050, first named inventor: Xiaobo Zhou, filing date: Jul. 9, 2024.
Office Action mailed Oct. 14, 2025, in related U.S. Appl. No. 18/766,964 and examined claims 1-20.
Office Action mailed Oct. 14, 2025, in related U.S. Appl. No. 18/767,017 and examined claims 1-15.
Office Action mailed Oct. 14, 2025, in related U.S. Appl. No. 18/767,050 and examined claims 1-20.
Amendment and Response filed on Dec. 19, 2025, in related U.S. Appl. No. 18/767,017.

* cited by examiner

ROLLING BEARING AND METHOD OF MANUFACTURING SAME

CROSS-REFERENCE

This application claims priority to German patent application no. 10 2023 207 105.3 filed on Jul. 26, 2023, the contents of which are fully incorporated herein by reference.

TECHNOLOGICAL FIELD

The present invention is directed to a rolling bearing having a composite polymer sheet attached thereto and to a method of manufacturing a rolling bearing having a composite polymer sheet attached thereto.

BACKGROUND

Many rotating mechanical apparatuses may include a rolling bearing that enables the relative rotation between a first component and a second component. For example, the first component may be a housing and the second component may be a rotating shaft, wherein an outer ring of the rolling bearing is fitted into the housing and/or an inner ring of the rolling bearing is fitted onto the shaft. Depending on the specific application, it can happen, either due to loads deforming the ring or by design, that one of these fits is a loose fit, which may lead to ring creep.

In some cases, this ring creep may induce a so-called ring creep wear damage. For example, if a steel outer ring is loosely fitted into an aluminum alloy housing, there is a chance that a ring creep of the outer ring induces ring creep wear damage on the aluminum alloy housing due to the relative motion (ring creep movement) between the outer ring and housing. In other words, the outer diameter surface of the outer ring and an inner surface of the housing are rubbed against each other so that wear occurs on the housing. When the wear of the housing increases, a backlash may occur at a rotation support part so that abnormal vibration is generated and the rotating mechanical apparatus is out of order. This may further lead to a loss of alignment which may cause undesired noise. Also, creep wear may cause debris and/or contaminants that may damage the bearing and/or parts of the mechanical apparatus such as gears which may lead to a shorter life of the bearing and/or the mechanical apparatus.

This ring creep movement may be prevented by interlocking or by a rubber O-ring. However, in practice, the interlocking mechanism and rubber O-ring are not a desired solution since it is difficult to realize and/or not reliable. Polymer coating of the rubbing surfaces using solid lubricants and pre-treatment by manganese-phosphating (MnPh) is an alternative solution to reduce the creep wear. So far, the coatings include antimony (Sb), which is regarded a toxic material to human health, and the necessary coating process is very complicated since it requires submerging a complete bearing into an acid liquid bath for the manganese-phosphating process and a thermal curing of the polymer coating.

SUMMARY

It is therefore an aspect of the present disclosure to reduce creep wear damage.

In the following, a rolling bearing is provided which includes at least one outer ring, at least one inner ring, and at least one rolling element arranged between the at least one outer ring and the at least one inner ring. An outer surface of the at least one outer ring is configured to be fitted into a first component, such as a housing, and an inner surface of the inner ring is configured to be fitted to a second component, such as a shaft, wherein the first component and the second component are rotatable relative to one another.

The outer surface of the at least one outer ring may be the radial outer surface of the ring, such as the outer circumference surface of the outer ring. The inner surface of the at least one inner ring may be the radially inner surface of the ring, such as an inner bore of the inner ring. For example, the rolling bearing may be a ball bearing, a cylindrical roller bearing, a tapered roller bearing, and the like. Furthermore, the outer and/or inner ring may be made from a first material. The first material may be steel, particularly bearing steel. The first component and/or second component may be made from a second material that is different from bearing steel. In particular, the second material may be softer than the first material. For example, the second material may be aluminum, an aluminum alloy, or the like. Moreover, the roller bearing may be used in an electric motor, for example in an electric vehicle, or a pump.

In order to reduce creep wear and manufacturing costs, a polymer composite sheet layer (sometime referred to as a polymer composite sheet) is bonded on at least one of the outer surface of the outer ring and the inner surface of the inner ring using a bonding agent. Such a polymer composite sheet layer can reduce the wear on the element that is fitted to the outer and/or inner ring such that abnormal vibrations and/or noise may be mitigated. Furthermore, the polymer composite sheet layer or liner may be cut to size before bonding the polymer composite sheet layer to the surface, which can reduce the manufacturing costs. In particular, a coating process can be omitted. Also, it may be possible to replace the polymer composite sheet layer if it is worn.

Preferably, the polymer composite sheet layer comprises polyether ether ketone (PEEK), polyphenylene sulfide (PPS), polyester (PET), polyurethane (TPU), polyethylene (PE), polypropylene (PP), polyimide (PI), and/or polyamide-imide (PAI). In particular, these compounds may exhibit self-lubrication and may have a high wear resistance. In addition, these compounds may be commercially available as sheet material which just has to be cut to size such that expensive coating processes can be omitted.

According to a further preferred embodiment, the polymer composite sheet layer comprises 1 to 50 wt %, preferable 5 to 20 wt % of at least one solid lubricant. Preferably, the solid lubricant is molybdenum disulfide (MoS2). Due to the solid lubricant, the amount of wear on the outer and/or inner ring surface and/or the first and/or second component may be reduced which may also reduce the amount of debris. This may reduce damage of the bearing and/or parts of the mechanical apparatus such as gears which may lead to a longer life of the bearing and/or the mechanical apparatus.

The polymer composite sheet layer may have a thickness between 2 to 200 μm, preferably between 5 to 30 μm. When the layer thickness is smaller than 2 μm, the polymer composite sheet layer may be worn at an early stage and the creep wear resistance cannot be kept for a long time. On the other hand, when the film thickness exceeds 200 μm, the strength of the polymer composite sheet layer may be lowered so that the polymer composite sheet layer may be peeled off. Thus, a layer thickness between 2 and 200 μm allows for an effective reduction of the creep wear, with a reduced risk that the polymer composite sheet layer is peeled off.

Preferably, the bonding agent is adhesive epoxy, or a cyanoacrylate glue. For example, the epoxy glue may be air-hardening, UV hardening and/or cure hardening.

Furthermore, the bonding agent may be applied as a bonding layer having a thickness below 25 μm, preferably below 5 μm. This allows for a secure bonding of the polymer composite sheet layer to the surface.

In addition or alternatively, the polymer composite sheet layer may be provided with an adhesive on one side, wherein the adhesive is an acrylic adhesive or a silicone. Thus, it may be possible to bond the polymer composite sheet layer to at least one of the outer surface of the outer ring and the inner surface of the inner ring without the need to apply the bonding agent in an extra bonding layer. This may reduce manufacturing costs.

Preferably, a surface roughness Ra of the outer surface of the outer ring and/or the inner surface of the inner ring is 0.5 to 10 μm, preferably 1 to 3 μm, before the polymer composite sheet layer is applied. This allows for an improved bonding of the polymer composite sheet layer on the outer surface of the outer ring and/or the inner surface of the inner ring. Preferably, a backside of the polymer composite sheet layer is pretreated using chemical etching and/or plasma etching. This may improve the bonding of the bonding agent to the polymer composite sheet layer.

Preferably, a friction coefficient in dry contact against an aluminum alloy is between 0.05 to 0.4. In particular, a lower friction coefficient may indicate a lower amount of creep wear.

According to a further preferred embodiment, the polymer composite sheet layer has a dielectric strength greater than 15 kV/mm and a dielectric constant or relative permittivity of lower than 4.

In case that the rolling bearing is employed in an electric motor, for example in an electric vehicle, it may happen that electric current runs through the bearing and/or that an electric voltage is applied over the rolling bearing. Due to current leakage through the bearing, a lubricant in the bearing and/or the bearing itself, particularly the metal surfaces of the bearing such as the raceways for the rolling elements, may be damaged. The damages may include increase of surface roughness and/or noise and may damage the bearing function. By providing the outer surface of the outer ring and/or the inner surface of the inner ring with a polymer composite sheet layer that may have a dielectric strength greater than 15 kV/mm and a dielectric constant of lower than 4, the electric current passage intensity can be significantly reduced, for example by greater than 90%, and prolong the bearing service life. The relative high dielectric strength and low dielectric constant of the coating can reduce the current intensity and the bearing damage.

According to a further aspect of the disclosure a method for manufacturing a rolling bearing as mentioned above is provided. The method comprises: providing a polymer composite sheet layer comprising at least a polymer, applying a bonding agent on at least one of the outer surface of the outer ring and the inner surface of the inner ring and/or the polymer composite sheet layer, and bonding the polymer composite sheet layer to the at least one of the outer surface of the outer ring and the inner surface of the inner ring.

According to a further embodiment, the method further includes, before applying the polymer composite sheet layer, preparing the at least one of the outer surface of the outer ring and the inner surface of the inner ring to have a surface roughness Ra of 0.5 to 10 μm, preferably Ra 1 to 3 μm. This allows for an improved bonding of the polymer composite sheet layer on the outer surface of the outer ring and/or the inner surface of the inner ring. Preferably, a backside of the polymer composite sheet layer is pretreated using chemical etching and/or plasma etching. This may improve the bonding of the bonding agent to the polymer composite sheet layer.

BRIEF DESCRIPTION OF THE DRAWINGS

In the following, preferred embodiments of the invention are described in connection with the drawings, wherein the drawings are exemplarily only, and are not intended to limit the scope of protection. The scope of protection is defined by the accompanied claims, only.

DETAILED DESCRIPTION

Figure 1:
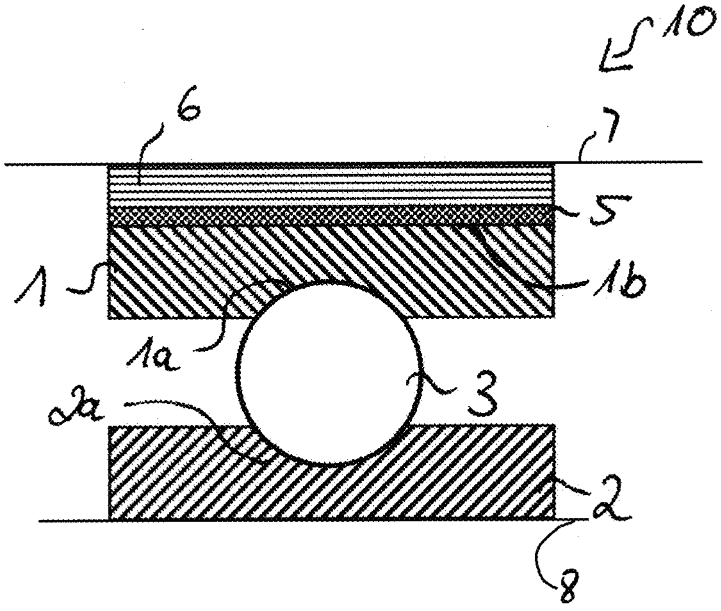
FIG. 1 is a sectional view of a rolling bearing according to an embodiment of the present disclosure.

In the following same or similar functioning elements are indicated with the same reference numerals.

A ball bearing is shown as an example of a rolling-element bearing in FIG. 1. However, the present disclosure is not limited to any particular type of rolling-element bearing. The ball bearing includes an outer ring 1 having an outer ring raceway 1*a*, an inner ring 2 having an inner ring raceway 2*a*, and a plurality of balls 3 arranged between the inner and outer raceways 1*a*, 2*a*. Also, an outer diameter surface 1*b* of the outer ring 1 of the ball bearing is fitted to a first component 7, such as a housing, and an inner peripheral surface of the inner ring 2 is fitted to a second component 8, such as a shaft.

The outer ring 1 and the inner ring 2 are made of metal, for example bearing steel. Further, the outer diameter surface 1*b* of the outer ring 1 is provided with a bonding layer 5 comprising a bonding agent, which bonds a polymer composite sheet layer 6 to the outer diameter surface 1*b* of the outer ring 1. The housing is made of aluminum or aluminum alloy (for example, aluminum die-cast material) to reduce weight in many cases. Since the polymer composite sheet layer 6 is softer than aluminum or aluminum alloy (for example, aluminum die-cast material), the housing is not damaged even though the outer diameter surface 1*b* of the outer ring and the housing may move with respect to each other.

The polymer composite sheet layer 6 comprises a polymer such as polyether ether ketone (PEEK), polyphenylene sulfide (PPS), polyester (PET), polyurethane (TPU), polyethylene (PE), polypropylene (PP), polyimide (PI), and/or polyamide-imide (PAI). Additionally, the polymer composite sheet layer 6 may also include at least one solid lubricant. However, the above noted polymers may also have sufficient self-lubricating properties such that an additional solid lubricant may be omitted.

If a solid lubricant is added to the polymer composite sheet layer 6, the solid lubricant is required to have lubrication performance and to be softer than a material of the housing, which in the present embodiment is aluminum or aluminum alloy. As the solid lubricant, molybdenum disulfide (MoS2) may be used. The content of the solid lubricant in the polymer composite sheet layer 6 may be between 1 and 50 wt %, preferable 5 to 20 wt %.

The polymer composite sheet layer 6 may be formed by an extruding method. For example, the raw materials for the polymer composite such as the used polymer or polymer mixture is dissolved (melted) and subsequently flow casted, using for example a drum cast. The obtained cast material is then forwardly and/or laterally stretched to the predetermined dimensions and finally rolled to obtain a roll of a polymer composite sheet material. This material can then be cut the needed size. Additives such as a solid lubricant may either be added at the beginning of the extruding method when the raw materials are dissolved and mixed and/or by using a coating method to coat the additives on the sheet material.

As the bonding agent adhesive epoxy or a cyanoacrylate glue can be used. The bonding layer 5 has a thickness of less than 25 μm, preferably less than 5 μm, and can be applied directly on the outer diameter surface 1*b* of the outer ring. Alternatively, the polymer composite sheet layer 6 is provided with an adhesive on one side, wherein the adhesive is an acrylic adhesive or a silicone.

Before the polymer composite sheet layer 6 is applied to the outer ring 1, a surface of the outer ring 1 is machined to have a surface roughness Ra of 0.5 to 10 μm, preferably 1 to 3 μm. This allows for an improved bonding of the bonding layer 5 on the surface. Then, the polymer composite sheet layer 6 is applied to the bonding layer 5. Preferably, the polymer composite sheet layer 6 may be cut to size before the polymer composite sheet layer 6 is bonded to the outer ring 1.

The thickness of the polymer composite sheet layer 6 is between 2 to 200 μm. When the thickness of the polymer composite sheet layer 6 is less than 2 μm, the polymer composite sheet layer 6 may prematurely wear and the creep wear resistance may not last long. On the other hand, when the thickness of the polymer composite sheet layer 6 exceeds 200 μm, the strength of the polymer composite sheet layer 6 is lowered so that the polymer composite sheet layer 6 may be peeled off. The thickness of the polymer composite sheet layer 6 is more preferably 5 μm to 30 μm.

Alternatively, when in situations in which creep is expected to occur between the inner ring and a shaft, the polymer composite sheet layer 6 may be bonded to the radially inner surface of the inner ring 2.

The present invention will be further described with reference to test examples. However, it should be noted that the present invention is not limited to these examples.

In this test, the effects that are to be accomplished by the bonded film of the present invention was verified.

For the test, a pin on disk test was performed, wherein a pin is moved with defined load and defined contact pressure over a disk for a predetermined amount of time. This allows wear depth as well as the average coefficient of friction to be determined. Two set were performed for the test, wherein in the first set a steel pin is moved over an aluminum disk and in the second set an aluminum pin is moved over a steel disk. In both sets, the steel component, namely the pin in the first set and the disk in the second set, were provided with a polymer composite sheet layer made of PEEK which was cut to size. Furthermore, uncoated reference samples were prepared as well. The polymer composite sheet layer was bonded to the workpiece with epoxy or cyanoacrylate. As reference samples, a coating containing a binder, molybdenum disulfide (MoS2) as a solid lubricant, as well as antimony according to the prior art as described for example in EP 3505783 A1 (family member of U.S. Pat. No. 10,563,697) were used.

The steel pin had a diameter of 82 mm, and the aluminum pin had a diameter of 64 mm. The defined load was 20 N for the steel pin and 10 N for the aluminum pin, wherein the average contact pressure was 130 MPa for the steel pin, and 124 MPa for the aluminum pin. The results for the wear depth of the aluminum and the polymer composite sheet layer are shown in FIGS. 2 and 3.

| Example No. | | Polymer |
|---|---|---|
| 1 | | PEEK |
| Ref. | $MoS_2$, $Sb_2O_3$ | — |
| Uncoated | — | — |

Figure 2:
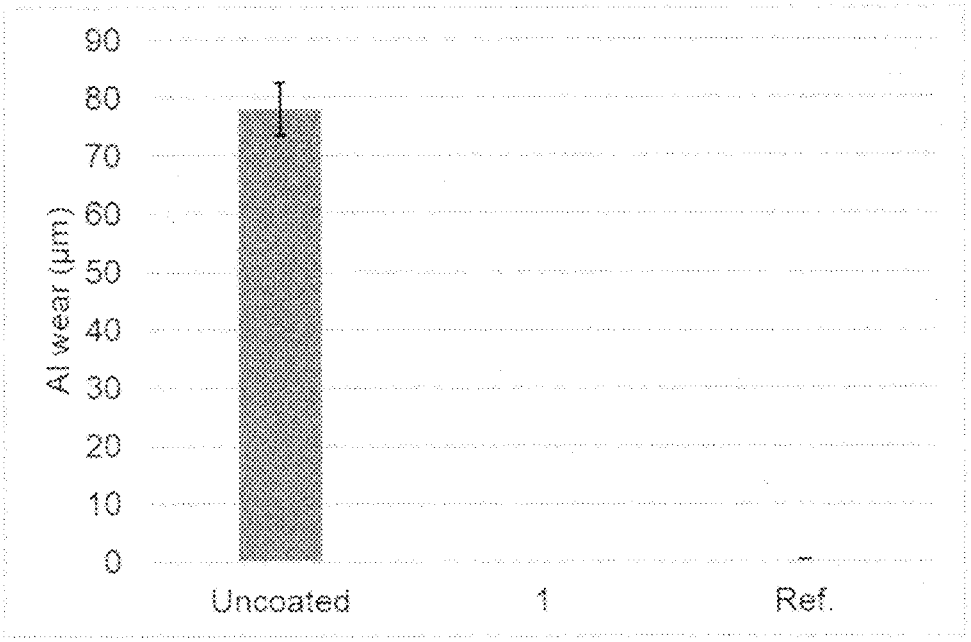
FIG. 2 is a graph obtained in an experiment, depicting an aluminum wear depth for a polymer composite sheet layer, and reference examples.
Figure 3:
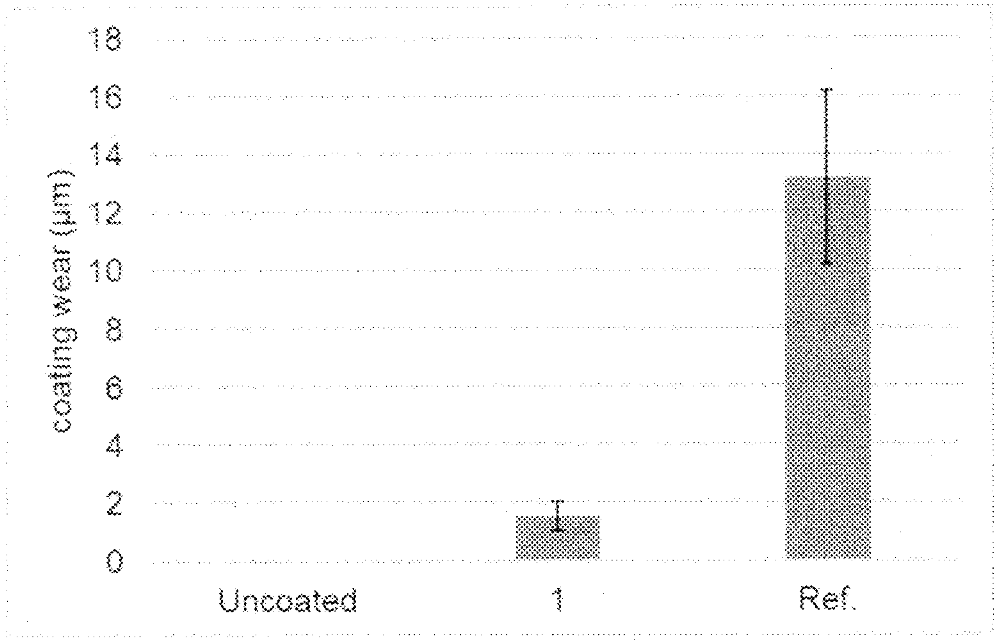
FIG. 3 is a graph obtained in an experiment, depicting a wear depth of the polymer composite sheet layer.

It can be seen from FIGS. 2 and 3 that wear on the aluminum and the polymer composite sheet layer 6 can be significantly reduced and is significantly smaller than the reference coating.

In summary, the described polymer composite sheet layer 6 can reduce the wear on an element which is fitted to the outer and/or inner ring, such as an aluminum housing, such that abnormal vibrations and/or noise may be mitigated. The described polymer composite sheet layer 6 has a low coefficient of friction which may allow a reduction in the amount of debris resulting in a longer life of the bearing and/or the mechanical apparatus.

Also, the polymer composite sheet layer 6 can be cut to size before being bonded on the metal surfaces of the outer and/or inner ring. The bonding agent can be applied as a bonding layer and/or on one side of the polymer composite sheet layer 6.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMERALS

1 outer ring
1*a* outer raceway

1*b* outer surface
2 inner ring
2*a* inner raceway
3 rolling element
5 bonding layer
6 polymer composite sheet layer
7 first component
8 second component

What is claimed is:

1. A rolling bearing comprising:
an outer ring having an outer surface configured to be fitted into a first component,
an inner ring having an inner surface configured to be fitted onto a second component,
at least one rolling element arranged between the outer ring and the inner ring, and
a first polymer composite sheet bonded or adhered directly to the outer surface of the outer ring by a layer of bonding agent and/or adhesive and/or a second polymer composite sheet bonded or adhered directly to the inner surface of the inner ring by a layer of bonding agent and/or adhesive,
wherein the first and/or second polymer composite sheet is an extruded material having a uniform thickness of 2 to 200 μm.

2. The rolling bearing according to claim 1, wherein the first and/or second polymer composite sheet has a thickness of 5 to 30 μm.

3. The rolling bearing according to claim 1, wherein the first and/or second polymer composite sheet comprises polyether ether ketone (PEEK), polyphenylene sulfide (PPS), polyester (PET), polyurethane (TPU), polyethylene (PE), polypropylene (PP), polyimide (PI), and/or polyamideimide (PAI).

4. The rolling bearing according to claim 1, wherein the first and/or second polymer composite sheet comprises 1 to 50 wt % of at least one solid lubricant.

5. The rolling bearing according to claim 1, wherein the first and/or second polymer composite sheet comprises 5 to 20 wt % of at least one solid lubricant.

6. The rolling bearing according to claim 5, wherein the solid lubricant is molybdenum disulfide ($MoS_2$).

7. The rolling bearing according to claim 1, wherein the bonding agent is an epoxy adhesive or a cyanoacrylate glue.

8. The rolling bearing according to claim 1, wherein a thickness of the bonding agent is less than 25 μm.

9. The rolling bearing according to claim 1, wherein the first and/or second polymer composite sheet has an acrylic adhesive or a silicone on one side.

10. The rolling bearing according to claim 1, wherein a side of the first and/or second polymer composite sheet that is bonded or adhered to the outer ring and/or the inner ring, respectively, is chemically or plasma etched.

11. The rolling bearing according to claim 1, wherein the first and/or second polymer composite sheet has a dielectric strength greater than 15 kv/mm and a dielectric constant of lower than 4.

12. The rolling bearing according to claim 1, wherein:
the first and/or second polymer composite sheet has a thickness of 5 to 30 μm,
the first and/or second polymer composite sheet comprises polyether ether ketone (PEEK), polyphenylene sulfide (PPS), polyester (PET), polyurethane (TPU), polyethylene (PE), polypropylene (PP), polyimide (PI), and/or polyamideimide (PAI), and
the first and/or second polymer composite sheet comprises 5 to 20 wt % molybdenum disulfide ($MoS_2$).

13. An assembly comprising:
the rolling bearing, the first component and the second component according to claim 1,
wherein:
the first polymer composite polymer sheet is directly adhered or bonded to the outer surface of the outer ring,
the outer ring is fitted into the first component and the first polymer composite sheet directly contacts the first component,
the first component is a housing composed of an aluminum alloy,
the first composite sheet has a coefficient of friction in dry contact against the aluminum alloy of the first component in the range of 0.05 to 0.4,
the first polymer composite sheet layer has a relative permittivity of less than 4, and
the inner ring is mounted on the second component, which is a rotatable shaft.

14. A method for manufacturing a rolling bearing comprising:
providing an outer ring having an outer surface configured to be fitted into a first component, the outer ring having a surface roughness Ra of 0.5 to 10 μm,
providing an inner ring having an inner surface configured to be fitted onto a second component,
providing at least one rolling element arranged between the outer ring and the inner ring,
providing a first polymer composite sheet that is an extruded material having a uniform thickness of 2 to 200 μm and has an adhesive on a first side of the polymer composite sheet, and
applying the first polymer composite sheet to the outer surface of the outer ring such that the adhesive directly bonds the first polymer composite sheet to the outer surface of the outer ring.

15. The method according to claim 14, wherein the method further includes, before applying the adhesive to the first polymer composite sheet, pretreating the first side of the polymer composite sheet using chemical etching and/or plasma etching.

16. The method according to claim 14, wherein the first polymer composite sheet is composed of polyether ether ketone (PEEK) or polyphenylene sulfide (PPS).

17. The method according to claim 14, wherein the first polymer composite sheet comprises 1 to 50 wt % of at least one solid lubricant.

18. The method according to claim 17, wherein the solid lubricant is molybdenum disulfide ($MoS_2$).

19. The method according to claim 14, wherein the adhesive has a thickness of less than 25 μm.

* * * * *